Oct. 15, 1940.   P. M. HALL   2,218,197
ELECTRIC WELDING PROCESS
Filed Dec. 22, 1937
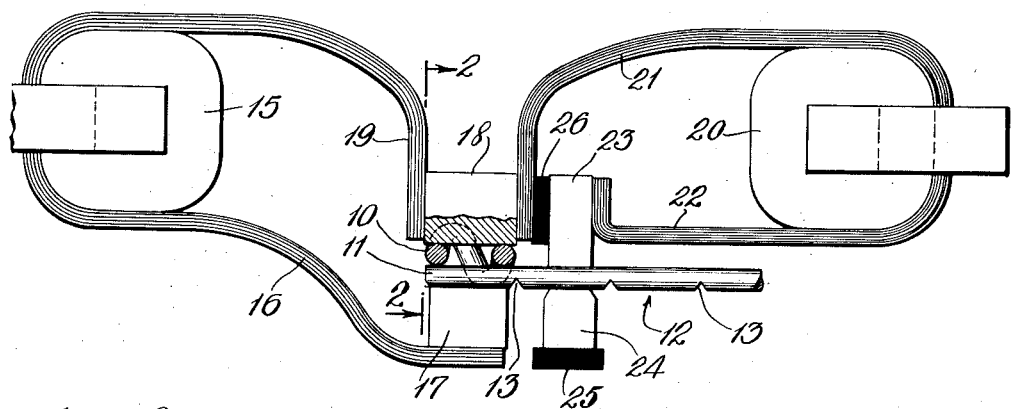
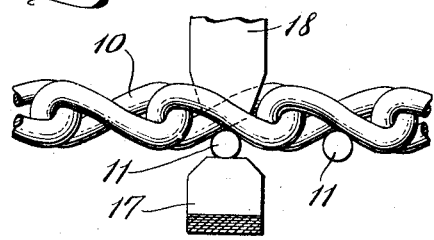
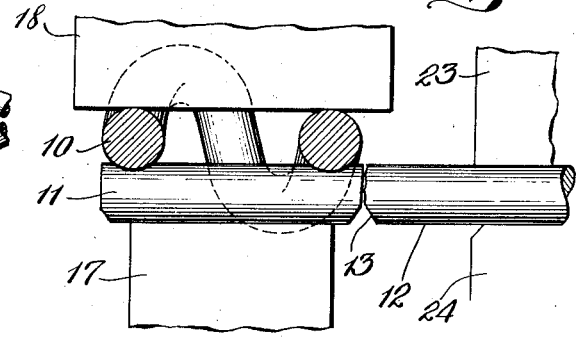
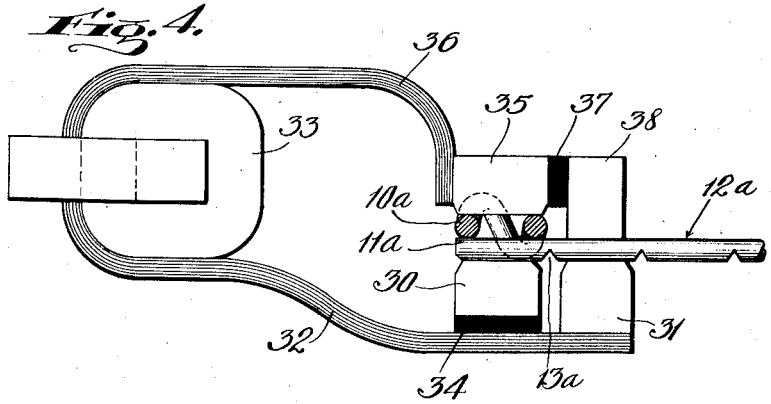
INVENTOR
PRESTON M. HALL
BY
Frederick P. Daneau, ATTORNEY Patented Oct. 15, 1940

2,218,197

UNITED STATES PATENT OFFICE 2,218,197

ELECTRIC WELDING PROCESS

Preston M. Hall, Worcester, Mass., assignor to American Chain & Cable Company, Inc., New York, N. Y., a corporation of New York Application December 22, 1937, Serial No. 181,078

8 Claims. (Cl. 219—10)

The present invention relates to the welding of cleats or reinforcements or other devices to a series of elements, such for instance, as the links of a chain.

The handling of such reinforcements has heretofore proved awkward. In machines for applying reinforcements to chain links various contrivances for individually feeding the relatively small reinforcement members and holding them in place while being welded fast, have involved complex mechanism.

It is an object of the present invention to avoid the difficulties of handling individual reinforcements by employing instead a continuous length of stock from which the reinforcements are severed only during or after the welding of each to a chain link. Manifestly, a length of stock, such for instance as a rod, may be handled more easily than can a plurality of short separate pieces. The stock is fed to welding position across the line of feed of the chain and only after an end portion thereof has been clamped to the link between the welding electrodes, is such portion severed from the main stock.

Preferably the reinforcement consists of a cross bar connecting opposite side elements of the chain link, and the stock consists of a series of cross bars integrally connected end to end. However, the cross-section of the reinforcements may be varied at will.

A further object of my invention is to provide an electrical means for severing the cross bars from the rod. More specifically my invention contemplates the use of a rod which is notched at intervals, each corresponding to the length of the desired cross bar so that the cross-section at the junction planes of this cross bar section is materially reduced. While welding current is being passed through a link and the rod to weld the link to the end cross bar section of the rod, a severing current is also passed through the notched connection of said section to the rest of the rod, and the severing current is of sufficient intensity to produce a cleavage of said section from the rest of the rod at the notch. I have found that it is possible to sever a piece from a rod in this manner by passing sufficient current through a notched portion of the rod to heat such portion to a high intensity. When this occurs a crack appears in the rod and develops into a fissure which completely severs the rod without the necessity of exerting any tension between the parts on opposite sides of the notch.

With the above named objects in view and others which will appear hereinafter, I shall now describe a preferred apparatus for carrying out my novel method and also a modification of such apparatus, and thereafter the novelty and scope of my invention will be set forth in the claims.

In the accompanying drawing:

Figure 1 is an end elevation of apparatus for applying a reinforcement to a chain link and severing the reinforcement from a continuous rod, said apparatus employing two transformers;

Fig. 2 is a detail view in section taken on the line 2—2 of Fig. 1;

Fig. 3 is an enlarged fragmental end elevation showing how the reinforcement is severed from the main stock; and Fig. 4 is an end elevation of a modified apparatus using a single transformer for supplying the welding current and the severing current.

In the drawing, a chain of curb links 10 is shown to which reinforcements 11 in the form of cross bars are being welded. These reinforcements are brought to welding position as integral parts of a continuous rod 12. The rod is notched at intervals, each equal to the desired length of the cross bars, the notches being shown at 13. Welding current is supplied by a transformer 15. A lead 16 forming one terminal of the secondary of the transformer is connected to a fixed electrode 17 which forms an anvil for the parts to be welded. The rod 12 is fed intermittently transversely across the top of the anvil 17, to bring the cross bar lengths 11 successively into welding position, while the chain 10 is intermittently fed at right angles to the longitudinal axis of the bar. Each chain link is pressed down upon a cross bar portion at the welding point by means of an electrode 18 which is connected to a flexible lead 19 forming the other terminal of the secondary of the transformer, so that the secondary circuit is completed through the cross bar 11 and chain link 10 and the two parts are thus welded together.

The electrode 18 is preferably contoured to fit the surface of the curb link. The lead 19 is sufficiently flexible to permit of raising and lowering the electrode 18 whereby the latter may be drawn clear of the chain to permit of bringing the next link into welding position. Obviously the cross bar could be applied to the top of the link, in which case the surface of electrode 17 would be contoured to fit the curb link. It will be understood that such contouring is not deep enough to hinder feeding of the chain when the electrodes are separated.

In order to provide current for severing the cross bar 11 from the main stock 12, I employ a second transformer 20. The secondary of this transformer has one flexible lead 21 connected to the electrode 18 and another flexible lead 22 connected to an electrode 23 which bears on the cross bar section next adjacent that which is clamped between electrodes 17 and 18. A block 24 serves to support the rod under the thrust of electrode 23, this support being mounted on a block of insulation 25. Thus, when the electrode 18 is depressed to cause welding of a cross bar section 11 to a link 10, the electrode 23 is simultaneously depressed so as to provide a good electrical contact between the electrode 23 and the rod 12, and, while current from the transformer 15 is welding the cross bar section to the link 10, current from the transformer 20 will pass from electrode 18 to electrode 23 through a notched portion 13 of the rod 12. The reduction in cross-sectional area at this notch 13 causes a concentration of current which heats the bar sufficiently to crack and sever the bar, as shown in Fig. 3, interrupting the severing current. In this manner each cross bar 11 as it is being welded to the link 10 is electrically severed from the stock 12.

An advantage of such electric severing is that no shearing mechanism is necessary to cut pieces from the reinforcement rod 12 and the welding operations can be carried out rapidly since there are only three intermittent movements of the parts, namely, the intermittent feed of the chain to bring successive links into welding position, the intermittent movement of the rod 12 to bring successive cross bars to position, and the intermittent movement of the electrodes 18 and 23 to establish good electrical contact between these electrodes and the link 10 in one case, and rod 12, in the other. In order to move the electrodes 18 and 23 simultaneously into operative position these electrodes may be mechanically connected but electrically separated by an insulating block 26.

The apparatus shown in Fig. 4 is adapted to cause welding and severing with the use of a single transformer. In this apparatus it will be observed that a chain link 10a is in welding position upon one of a series of cross bars 11a which are integrally connected to form a continuous rod 12a, the rod being formed with a notch 13a between each pair of cross bars. The cross bar 11a which is to be welded to the link is supported on an anvil 30, while the next adjacent cross bar is supported on an electrode 31. The latter is connected by a lead 32 to one end of the secondary coil of the transformer 33. There is a block of insulation 34 under the anvil 30 which serves to prevent current from passing directly through this anvil from the lead 32. The link 10a and reinforcement bar 11a are pressed down against the anvil 30 by means of an electrode 35 which is connected by a flexible lead 36 to the other end of the secondary coil. Thus, the secondary or welding current produced by the transformer 33 flows through the link 10a and reinforcement bar 11a between electrodes 35 and 31, thereby passing through the constriction or notched connection 13a between the section engaging the link and the section engaging electrode 31. In order to establish a good electrical contact between the rod 12a and the electrode 31, a block 38 is carried by the electrode 35, but is insulated therefrom by a plate of insulation material 37. In operation, the current which is powerful enough to weld a cross bar 11a to the link 10 a generates sufficient heat at the notch 13a to sever the bar 11a from the main stock.

For purposes of disclosing my invention, I have thought it sufficient to illustrate and describe but two modifications of means by which the principles of my invention may be carried out. It will be obvious to those skilled in the art after understanding my invention that various changes can be made in the means disclosed. It is obvious that in Fig. 1 the strap 21 could be connected to the electrode 23 and the strap 22 to the electrode 17 so that the severing current passing through the notch would not pass through the body of the link. It is also obvious that the electrode 35 and block 38 of Fig. 4 could be formed integrally and connected to the strap 36 and that the strap 32 could be connected to the member 30 instead of the member 31 whereby the divided current passing through the severing point would not pass through the link. While I have described the welding and severing circuits as being closed at the electrodes simultaneously by movement of the electrodes, it is obvious that the electrodes may move concurrently or successively, and that the current flow in the circuit or circuits may be controlled by switches operated simultaneously, concurrently or successively as conditions may require or as found desirable.

It will be understood that my invention contemplates the use of an integrally connected series of reinforcement members regardless of their form provided there is a constriction between each pair of members adapted to offer such resistance to the passage of electric current therethrough as to burn out the constricted connection and thus sever the member being welded from the rest of the series of members. It will also be understood that the application of a reinforcement to a chain link or other object may be varied without departing from the scope of my invention as pointed out in the claims.

I claim:

1. The method of electrically welding a member to an object and severing said member from a body to which it is integrally connected by a neck portion of reduced cross-section, which consists in bringing the member and object into contact, and passing electric current through the point of contact of the member and object and through said neck, said current being of sufficient intensity to weld the member to the object and sever the member from said body by burning through said neck.

2. The method of electrically welding a member to an object and severing said member from a body to which it is integrally connected by a neck portion of reduced cross-section, which consists in bringing the member and the object into contact, and passing electric current serially through the neck portion and the point of contact of the member and object, said current being of sufficient intensity to weld the member to the object and sever the member from said body by burning through said neck.

3. The method of electrically welding a member to an object and severing said member from a body to which it is integrally connected by a neck portion of reduced cross-section, which consists in bringing the member and the object into contact passing a welding current through the point of contact of the member and object, and at the same time passing another electric current through said neck of sufficient intensity to burn through the neck and sever the member from the body.

4. The method of electrically welding to an object an end portion of a length of stock and severing said end portion from the stock, which consists in forming a notch in the stock at the desired severing point, moving said end portion into contact with the object, and passing electric current through the point of contact of said end portion and said object to weld said end portion to said object and through the stock at the notched severing point to sever said end portion from the stock by burning through the stock at said notched severing point.

5. The method of electrically welding to an object the end portion of a length of stock and severing said end portion from the stock, which consists in forming a notch in the stock at the desired severing point, moving said end portion into contact with said object, and passing electric current serially through the object, said end portion and the stock at said notched severing point, to weld said end portion to the object and to sever said end portion from the stock by burning through the stock at said notched severing point.

6. The method of electrically welding to an object an end portion of a length of stock and severing said end portion from the stock, which consists in forming a notch in the stock at the desired severing point, moving said end portion into contact with said object, passing a welding current through the point of contact of said end portion and said object to weld said end portion to said object, and concurrently passing another electric current through the stock at said notched severing point to burn through the stock at said point.

7. The method of welding a section of a length of stock to an object and severing said section from the stock which consists in forming a notch in the stock at the desired severing point, in bringing said section of the stock into welding contact with an object and in passing electric current through said section and object to weld said section to said object and through said stock at said severing point to sever said section from the stock.

8. The method of welding a section of a length of stock to an object and severing said section from the stock which consists in forming a notch in the stock at the desired severing point, in bringing said section of the stock into welding contact with an object and in passing electric current over parallel paths through the point of contact between said section and said object to weld said section to said object, one of said paths extending through the notched portion of the stock at the end of said section to sever said section from the main body of said stock.

PRESTON M. HALL.